United States Patent [19]

Brown

[11] 4,136,559
[45] Jan. 30, 1979

[54] TORQUE METER MEANS
[75] Inventor: Winthrop K. Brown, Bellaire, Tex.
[73] Assignee: Texaco, Inc., New York, N.Y.
[21] Appl. No.: 794,285
[22] Filed: May 5, 1977
[51] Int. Cl.² .............................................. G01L 3/10
[52] U.S. Cl. ................................ 73/136 A; 324/83 D
[58] Field of Search .................... 73/136 A; 324/83 D

[56] References Cited
U.S. PATENT DOCUMENTS

| | | | |
|---|---|---|---|
| 3,640,131 | 2/1972 | Turk | 73/136 A |
| 4,020,685 | 5/1977 | Van Millingen | 73/136 A |

Primary Examiner—Charles A. Ruehl
Attorney, Agent, or Firm—Thomas H. Whaley; Carl G. Ries; Ronald G. Gillespie

[57] ABSTRACT

A torque meter which measures the torque of a rotating shaft includes at least two sensors. Portions of each sensor are fixed to the shaft. The sensors provide shaft pulse signals at the same frequency but having a phase difference corresponding to the torque experienced by the shaft. A clock provides clock pulses. A circuit connected to the sensors and to the clock provides first groups of pulses in accordance with the shaft pulse signals so that the number of pulses in each group of the first group of pulses corresponds to the torque experienced by the shaft at a constant speed. A first counting network counts the pulses from the circuit. Another circuit connected to the clock provides second groups of pulses and is responsive to the speed of shaft rotation so that a ratio of a group of pulses from the first group of pulses to a corresponding group of pulses from the second group of pulses averages out errors due to the shaft rotation and the sensors. A second counting network counts the pulses from the second pulse means. Both counting networks are reset every revolution of the shaft. An output circuit provides an output corresponding to the torque experienced by the shaft in accordance with the ratio of the counts in accounding networks.

8 Claims, 4 Drawing Figures

TORQUE METER MEANS

BACKGROUND OF THE INVENTION

Field of the Invention

The present invention relates to meters in general and, more particularly, to torque meters.

SUMMARY OF THE INVENTION

A torque meter which measures the torque of a rotating shaft includes at least two sensors. A portion of each sensor is affixed to the shaft. The sensors provide shaft pulse signals at the same frequency but having a phase difference corresponding to the torque experienced by the shaft. A clock provides clock pulses. A circuit connected to the sensors and to the clock provides first group pulses in accordance with the shaft pulse signals so that the number of pulses in each group of the first groups of pulses corresponds to the torque experienced by the shaft at a constant speed. A first count network counts the pulses provided by the circuit. Another network connected to the clock provides second groups of pulses and is responsive to the speed of the shaft rotations so that a ratio of a group of pulses from the first groups of pulses to a corresponding group of pulses from the second groups of pulses averages out errors due to the speed of shaft rotation and the positions of the sensors. A second counting network counts the pulses in the second group of pulses. A circuit provides a reset pulse for resetting the counting networks each revolution of the shaft. An output network connected to both counting networks provides an output corresponding to the torque experienced by the shaft in accordance with the ratio of the counts in the counting networks.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 2A through 2C are graphical representations of pulses occurring during the operation of the torque meter shown in FIG. 1.

DESCRIPTION OF THE INVENTION

Figure 1:
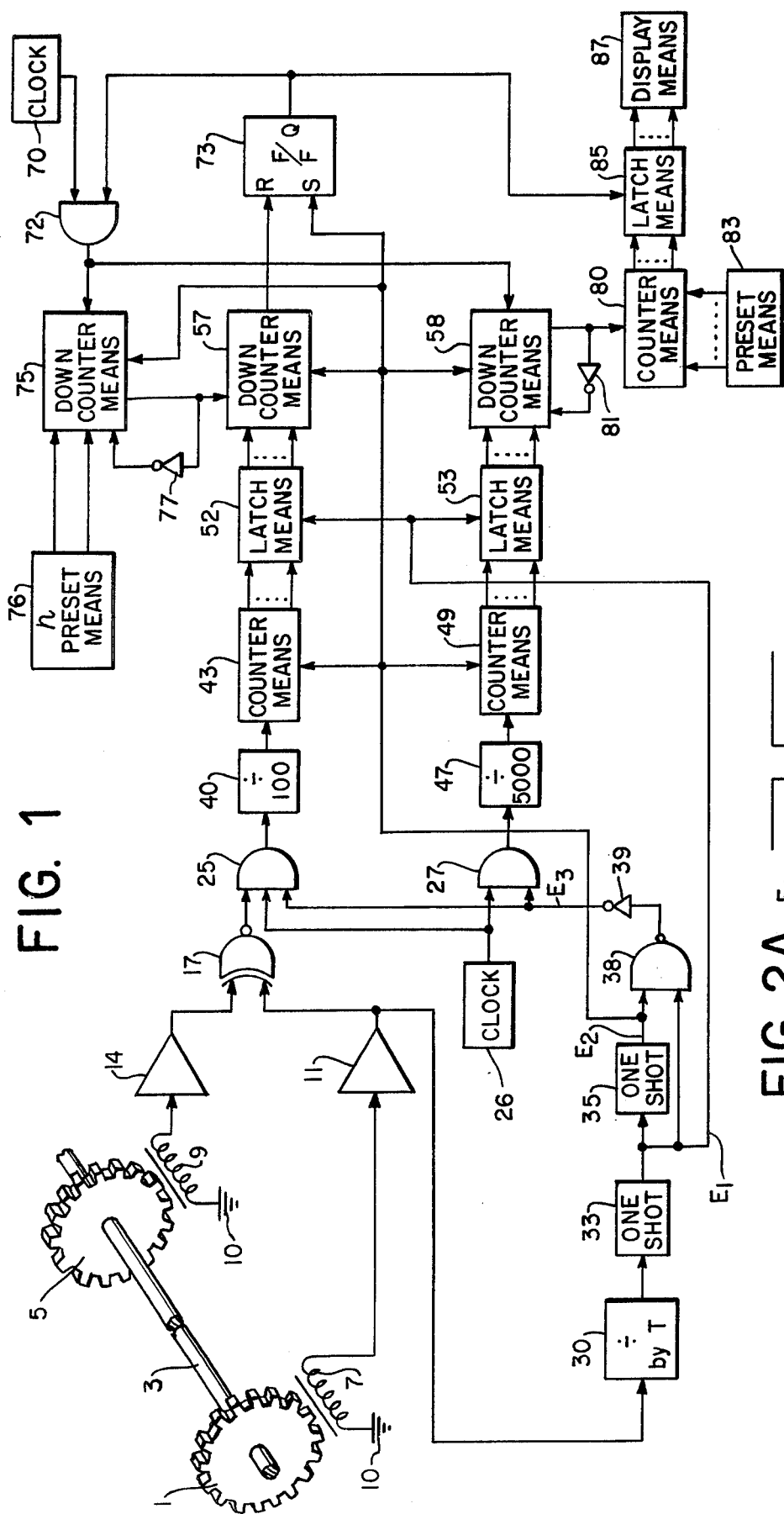
FIG. 1 is a simplified block diagram of a torque meter, constructed in accordance with the present invention, for measuring the torque experienced by a rotating shaft.

Referring to FIG. 1, there is shown a torque meter having a wheel 1, with teeth, mounted on a shaft 3. At another location on shaft 3, there is mounted another wheel 5 substantially identical to wheel 1. As shaft 3 rotates, the teeth in wheels 1, 5 pass pick-up coils 7 and 9, respectively, which are connected to ground 10. As each tooth passes a corresponding coil an electric voltage is induced therein so that during rotation of shaft 3, coils 7 and 9 provide pulses.

The pulses from coils 7, 9 are applied to squaring amplifiers 11 and 14, respectively. Squaring amplifiers 11 and 14 may be omitted if the pulses provided by coils 7, 9 are suitable. The outputs from squaring amplifiers 11, 14 are applied to an exclusive NOR gate 17.

When amplifiers 11, 14 are simultaneously providing a pulse, exclusive NOR gate 17 provides a high logic level output. When one and only one of the amplifiers 11 or 14 is not providing a pulse, exclusive NOR gate 17 provides a low logic level output. If both amplifiers 11 and 14 are not providing a pulse exclusive NOR gate 17 produces a high output. Thus, the duration of a low output from exclusive NOR gate 17 corresponds to the torque experienced by shaft 3 for a given speed. The output from exclusive NOR gate 17 is applied to an AND gate 25.

A clock 26 provides clock pulses to AND gate 25 and to another AND gate 27.

The pulses from amplifier 11 are provided to a divider 30 which divides the pulses by a number equal to the number of teeth on wheel 1 or 5. Each pulse provided by divider 30 triggers a one-shot 33 to provide a negative going 'enter' pulse $E_1$, shown in FIG. 2A. Pulses $E_1$ are provided to another one-shot 35 triggering it to provide a negative going 'reset' pulse $E_2$, shown in FIG. 2B. Pulses $E_1$, $E_2$ are applied to a NAND gate 38 causing it in effect to provide a positive going pulse. The positive going pulse is applied to an inverter 39 which provides a negative going pulse $E_3$, as shown in FIG. 2C. Pulse $E_3$ is provided to AND gates 25, 27 and effectively disables them for the duration of the pulse $E_3$ so that any counting as hereinafter explained would not occur during the occurrence of pulses $E_1$, $E_2$.

The clock pulses from clock 26 pass through AND gate 25 when the signal from exclusive NOR gate 17 is at a high level and while there is an absence of pulse $E_3$. The passed pulses from AND gate 25 are provided to a 'divide by 100' divider 40. The pulses from divider 40 are applied to counter means 43 which counts them in an up direction. Similarly, clock pulses from clock 26 pass through AND gate 27, during the absence of a pulse $E_3$, and are applied to a 'divide by 5,000' divider 47 whose pulses are applied to counting means 49. It should be noted at this point that counter means 43 contains a count corresponding to a phase difference while counter means 49 contains a count corresponding to the time duration of one cycle of the torque meter. Counter means 43 and 49 are periodically reset to zero by 'reset' pulse $E_2$ from one-shot 35 and provide digital signals corresponding to the counts to latch means 52 and 53, respectively. Latch means 52 and 53 store the digital signals from counter means 43 and 49 in response to a pulse $E_1$ from one-shot 33. Thus the sequence of events is such that latch means 52 and 53 store the digital signals from counter means 43 and 49, respectively, and then counter means 43 and 49 are reset to zero. Latch means 52 and 53 provide digital signals to down counter means 57 and 58, respectively.

A clock 70 provides clock pulses to an AND gate 72. AND gate 72 is controlled by the output of a flip-flop 73 to pass or block the clock pulses from clock 70. Pulses passed by AND gate 72 are provided to down counter means 75, 58. Preset means provides signals corresponding to a predetermined multiplication factor N to downcounter means 75 which enter those signals in response to a pulse $E_2$. Upon counting down, downcounter means 75 provides a pulse to downcounter means 57 and presets downcounter means 75 so that the counting down of counter means 75 repeats until AND gate 72 is disabled. Downcounter means 57 provides a pulse output upon reaching zero count to reset flip-flop 73, thereby disabling AND gate 72 and stops the passage of the clock pulses from clock 70 so that the number of pulses passed by AND gate 72 corresponds to the product of N and the count in counter means 43. Since the count in counter means 49 is less than or equal to N times the count in counter means 43, the pulses provided by AND gate 72 cause counter means 58 to count down to a zero count repeatedly. When the count in counter means 58 reaches zero, it provides a pulse to another counter means 80 and to inverter 81. Inverter 81 inverts the pulse and provides it back to counter means 58 causing it to load in the digital signals from latch means 53, so that the counting down of counter means 58 keeps repeating. When flip-flop 73 is reset by counter means 57, the count in counter means 80 corresponds to the product N and the count in counter means 43 divided by the count in counter means 49. The count in counter means 80 also corresponds to the torque experienced in shaft 3.

Preset means 83 may be utilized to preset a count into counter means 80 corresponding to any alignment error between wheels 1 and 5.

Latch means 85 receives digital signals from counter means 80, corresponding to the count, and is controlled by the output from flip-flop 73 to enter the digital signals. Latch means 85 provides digital signals to display means 87, which may be of a conventional type, for providing a display corresponding to the torque experienced by shaft 3.

The apparatus of the present invention as hereinbefore described is for a torque meter providing a display corresponding to the torque experienced by a rotating shaft.

What is claimed is:

1. A torque meter for measuring the torque of a rotating shaft comprising at least two sensing means, portions of which are affixed to the shaft, for providing shaft pulse signals at the same frequency but having a phase difference corresponding to the torque experienced by the shaft, clock means for providing clock pulses, circuit means connected to the two sensing means and to said clock means for providing first groups of pulses in accordance with the shaft pulse signals so that the number of pulses in each group of the first groups of pulses corresponds to the torque experienced by the shaft, first counting means for counting the pulses from the circuit means, pulse means connected to the clock means for providing second groups of pulses in accordance with the shaft rotation; second counting means connected to the pulse means for counting the pulses from the pulse means, control pulse means connected to both counting means for resetting the counting means each revolution of the shaft, and ratio means connected to both counting means for averaging out errors due to the shaft rotation and providing an output corresponding to the torque experienced by the shaft in accordance with the ratio of the counts in the counting means.

2. A torque meter described in claim 1 in which each sensing means includes a wheel having teeth mounted on the shaft, and coil means placed adjacent to the wheel providing a pulse each time a tooth on the wheel passes the coil means.

3. A torque meter as described in claim 2 in which the control pulse means also provides 'enter' pulses and 'disabling' pulses; and the circuit means includes an exclusive NOR gate connected to both coil means for providing a low logic level signal when the shaft pulse signals are not at substantially the same amplitude and for providing a high logic level signal when the shaft pulse signal amplitudes are substantially the same, and a first AND gate connected to the exclusive NOR gate, the clock means and to the control pulse means, said first AND gate being controlled by the 'disabling' pulses so that the first AND gate will not pass clock pulses while an 'enter' pulse or a 'reset' pulse is being provided by the control pulse means.

4. A torque meter as described in claim 3 in which the first counting means includes first dividing means connected to the first AND gate for dividing the pulses from the first AND gate by a first predetermined factor and providing pulses corresponding to the division, a first counter connected to the first dividing means and to the control pulse means which counts the pulses provided by the first dividing means and is periodically reset by the 'reset' pulses from the control pulse means and provides digital signals corresponding to the count, first latch means connected to the first counter and to the control pulse means and controlled by the 'enter' pulses to periodically enter the digital signals from the first counter.

5. A torque meter as described in claim 4 in which the pulse means includes a second AND gate connected to the clock means and to the control pulse means for passing clock pulses during the absence of a disabling pulse from the control pulse means and for blocking clock pulses during the occurrence of a disabling pulse; and the second counting means includes second dividing means connected to the second AND gate for dividing pulses passed by the second AND gate by a predetermined factor substantially greater than the dividing factor of the first dividing means and providing pulses corresponding to the division, a second counter connected to the second dividing means which counts the pulses provided by the second dividing means and provides digital signals corresponding to the count and is periodically reset by the 'reset' pulses from the control pulse means, and second latch means connected to the second counter for periodically entering and storing the digital signals from the second counter in response to 'enter' pulses from the control pulse means.

6. A torque meter as described in claim 5 in which the ratio means includes second clock means providing clock pulses, a third AND gate, flip-flop means connected to the control pulse means and to the third AND gate for providing an output to control the third AND gate, third counting means connected to the control pulse means, to the flip-flop means and to the first latch means for entering the digital signals from the first latch means, so as to be an entered count, in response to an 'enter' pulse from the control pulse means and for counting down the entered count in response to passed clock pulses from the third AND gate and for providing a pulse output upon reaching a zero count to the flip-flop means so that the flip-flop means changes state to provide a low logic level output to the third AND gate thereby disabling the third AND gate to prevent further passage of clock pulses from the second clock means, fourth counting means connected to the second latch means in response to an 'enter' pulse from the control pulse means and counting down passed clock pulses from the third AND gate to provide a pulse output upon reaching zero which causes the fourth counting means to reset itself and to enter the digital signals provided by the second latch means, fifth counting means connected to the fourth counting means and third latch means connected to the fifth counting means and to the flip-flop means for entering digital signals provided by a fifth counting means in response to the flip-flop means output changing to a low logic level and providing digital signals corresponding to the stored count and to the ratio of counts in the first and second counters, and display means connected to the third latch means for providing a display corresponding to the torque experienced by the shaft in accordance with the digital signal from the third latch means.

7. A torque meter as described in claim 6 in which the ratio means further comprises means for multiplying the ratio by a predetermined factor.

8. A torque meter as described in claim 7 in which the multiplying means includes preset means providing digital signals corresponding to a predetermined multiplication factor, and sixth counting means connected to the preset means between the third AND gate and the third counting means for counting down the count in accordance with the pulses passed by the third AND gate and providing a pulse output to the third counting means each time the count reaches zero and providing a pulse to preset the sixth counting means so that the counting down of the sixth counting means repeats until the third AND gate is disabled.

* * * * *